April 26, 1966 J. H. AMMON 3,247,897
DIFFERENTIAL EXPANSION COMPENSATING APPARATUS
Filed Feb. 25, 1964 2 Sheets-Sheet 1

INVENTOR.
Johannes H. Ammon
BY
ATTORNEY

April 26, 1966  J. H. AMMON  3,247,897
DIFFERENTIAL EXPANSION COMPENSATING APPARATUS
Filed Feb. 25, 1964

3,247,897
DIFFERENTIAL EXPANSION COMPENSATING
APPARATUS
Johannes H. Ammon, Akron, Ohio, assignor to The Babcock & Wilcox Company, New York, N.Y., a corporation of New Jersey
Filed Feb. 25, 1964, Ser. No. 347,148
4 Claims. (Cl. 165—81)

This invention is directed to a differential expansion compensator and more specifically to a differential thermal compensator for use in heat transfer apparatus of the type having a plurality of tubes disposed within a pressure vessel wherein a first fluid is passed through the tubes and a second fluid is passed through the vessel exterior of the tubes with the transfer of heat occurring between the two fluids.

In heat exchangers of the prior art many problems have been encountered due to the differential thermal expansion encountered between the tubes and the pressure vessel. As the size of the pressure vessel and the temperature differences between the tubes and the pressure vessel during operation have increased, the problem of differential expansion has correspondingly increased. Also increases in the working pressure of the system with a resultant increase in the wall thickness of the various elements necessary to contain the increased pressure has added greatly to differential thermal expansion problems. This is due to the fact that as the wall thickness of the various elements increase, the relative flexibility of the elements decrease, making more difficult the ability of the elements to accommodate differential expansion. Frequently design considerations involve all of the foregoing features, compounding the problem of compensating for differential expansion between the elements comprising the arrangement. A further complicating feature is encountered when, as is often the case in present day heat exchange apparatus, some elements of the heat exchanger are made of one material, for example carbon steel in the case of the pressure vessel, and other elements are made of a different material, such as stainless steel for the tubes.

Many arrangements have been devised in an attempt to compensate for differential expansion between the elements of the heat exchanger apparatus. Among those are floating tube sheets, U-tube shaped heat exchange bundles, and bellows type expansion compensators. However, each of these devices has encountered certain problems so they have not proven entirely satisfactory for the application intended. One of the problems has been that of accommodating the differential expansion of small portions of the tube bundles with respect to the remainder of the tube bundle due to the fact that the tube sheets utilized in such arrangements were, because of the high pressures involved, extremely thick and inflexible.

The present invention is directed to a differential expansion compensator for heat exchanger apparatus which can readily accommodate comparatively large amounts of differential expansion between the tubes and the pressure vessel as well as differential expansion within the tube bundle itself.

Accordingly, the present invention relates to heat exchange apparatus comprising a vessel having fluid conduits disposed at each end thereof, with a plurality of tubular elements extending within the confines of the vessel and arranged in series flow relationship with the conduits and a differential expansion compensator connected between one end of the tubular elements and one of the fluid conduits, the expansion compensator comprising a header or headers each of which is connected to a particular group of the tubular elements, and coiled tubular elements connecting said headers to the fluid conduit.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 1:
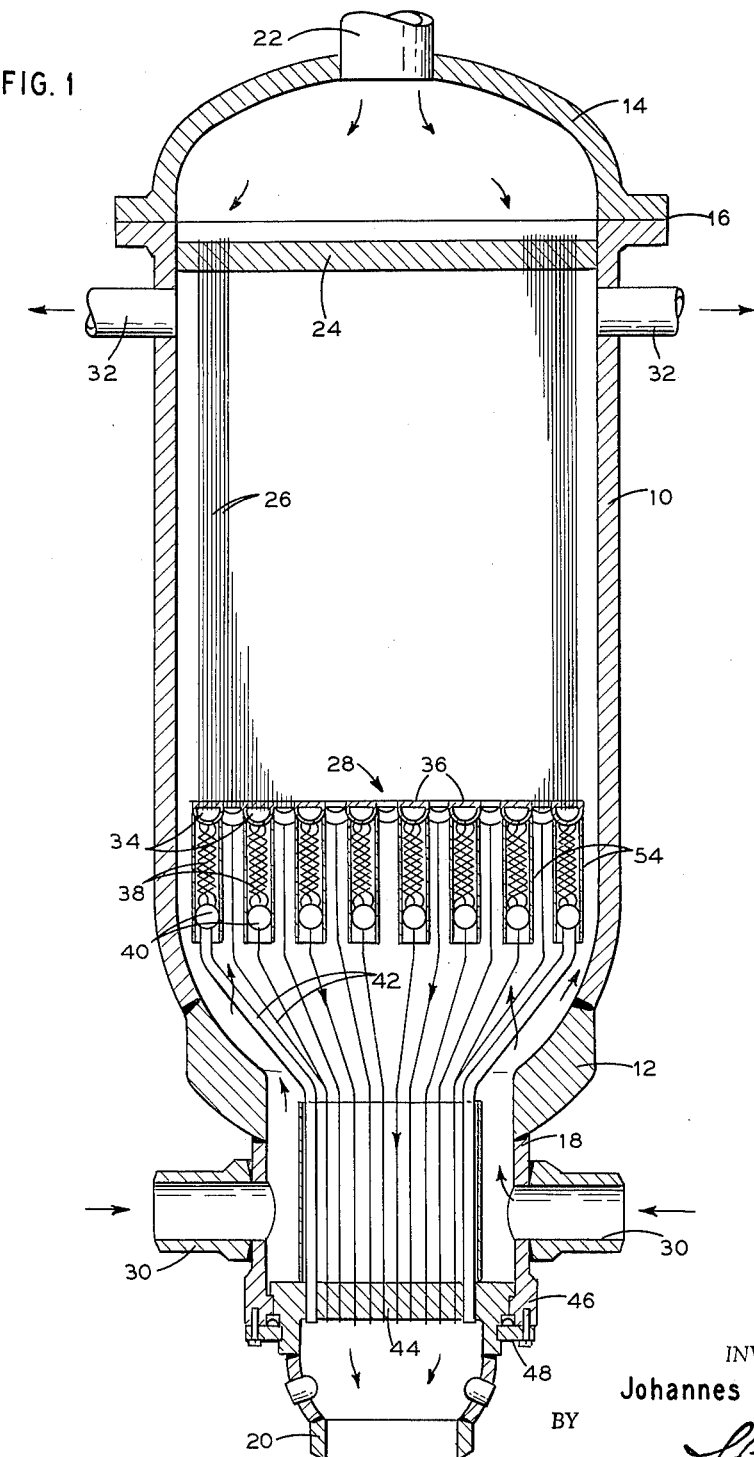
FIG. 1 is a longitudinal section of a heat exchanger incorporating the expansion compensator of the present invention.

The heat exchange apparatus, and particularly a heat exchanger, as illustrated in FIG. 1, comprises a pressure vessel 10 having an integrally connected lower head 12 and a removable upper head 14 which is connected to the main pressure vessel 10 by a flanged joint 16. A large nozzle-like connection 18 is integrally joined, as by welding, to the lower head 12 and contains therein a tubular nozzle extension 20. An inlet nozzle 22 for the primary fluid is provided through the upper head 14. A tube sheet 24 is fixedly connected in the upper portion of the pressure vessel and is integrally connected to a plurality of tubes 26 which extend through the pressure vessel and terminate in the expansion compensator, indicated by 28, in the lower portion of the pressure vessel. Inlet nozzles 30, for the secondary fluid which flows outside of the tubes 26, are provided in large nozzle 18 at the lower end of the pressure vessel, while outlet nozzles 32 for the secondary fluid are provided in the upper wall portion of the pressure vessel 10. In operation, a first or primary fluid is supplied to the pressure vessel through the inlet 22 and flows through the tubes 26, through the expansion compensator 28, and discharges through nozzle extension 20 in the lower portion of the pressure vessel. The secondary fluid enters the pressure vessel through nozzles 30, flows upwardly about the exterior of tubes 26 and out through nozzles 32. The flow of both the primary and the secondary fluid are generally indicated by arrows in FIG. 1.

Figure 2:
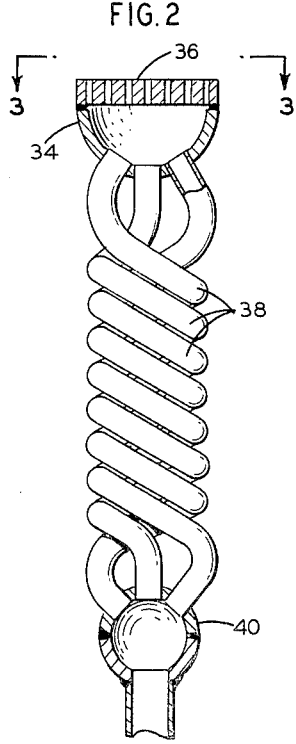
FIG. 2 is an enlarged detail of a single element of the expansion compensator of the present invention.

The expansion compensator 28, see FIG. 2, comprises a plurality of substantially hemispherical headers 34 each having a flat tube sheet 36 at the upper extremity thereof into which a plurality of tubes 26 are connected. A plurality of helicoidal tubes 38 are connected through the lower portion of each of the headers 34 and terminate in the associated lower headers 40. Connecting tubes 42 extend from the lower headers 40 to a small tube sheet 44 which is integrally connected to the upper end of the tubular nozzle 20. The tube sheet 44 and nozzle 20 arrangement is sealingly connected to the outer end of the large nozzle 18, with the outer edge of the tube sheet 44 abutting a flange 46 and being held in engagement there-with by a split ring assembly 48 which is boltably connected to nozzle 18 exterior of the pressure vessel. It is possible, by removing the split ring 48 and the upper closure head 14, to remove the entire tube bundle, intact, from the pressure vessel.

Differential expansion may be caused by the difference in the temperatures of the fluids contacting the various elements of the heat exchanger. For example, the temperature of the primary fluid flowing through tubes 26 may be sufficiently different from the temperature of the secondary fluid, which is in contact with the inner wall of pressure vessel 10, to cause the tubes 26 to expand a different amount than does the pressure vessel. Should the tubes 26 be rigidly joined at both ends, this differential expansion between the elements will cause stresses to be set up in both the tubes, the tube sheets, and the pressure vessel. Should these stresses be sufficiently large, structural damage may occur to the heat exchanger rendering it inoperative.

Figure 3:
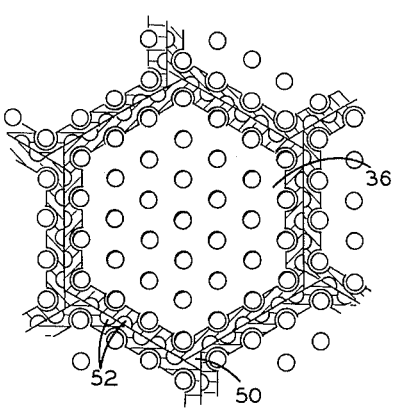
FIG. 3 is a plan view of the expansion compensator element shown in FIG. 2.

The differential expansion compensator 28 accommodates differential expansion by the flexing of the helicoidal tubes 38. In this way the tubes 26 are fixed at one end to tube sheet 24, while connecting tubes 42 are fixed at one end to tube sheet 44. Thus the headers 34, in which the opposite ends of tubes 26 are connected, are free to move in either direction with the flexing of the helicoidal tubes 38 extending between the headers 34 and lower headers 40. Furthermore, since a plurality of small headers 34 are used instead of a single heavy tube sheet, differential expansion of groups of tubes within the heat exchanger may be relatively easily accommodated without fear of rupturing the joints between the tubes and the tube sheet. As seen in FIG. 3, the small tube sheets 36 are hexagonal in shape and may be staggered with relation one to the other so that a uniform triangular spacing of the tubes within the tube bundle may be achieved. It will be noted that with this staggered arrangement triangular flow passages 50, for secondary fluid flow are formed at the corners of the tube sheet. Furthermore, relief notches 52 may be provided along each edge of the tube sheet so that uniformly distributed flow of the secondary fluid throughout the tube bundle may be accomplished. If it is desirable to minimize heat transfer between the helicoidal tubes and the secondary fluid, sleeve shields 54 (as shown in FIG. 1) may be used between headers 36 and 40.

Figure 4:
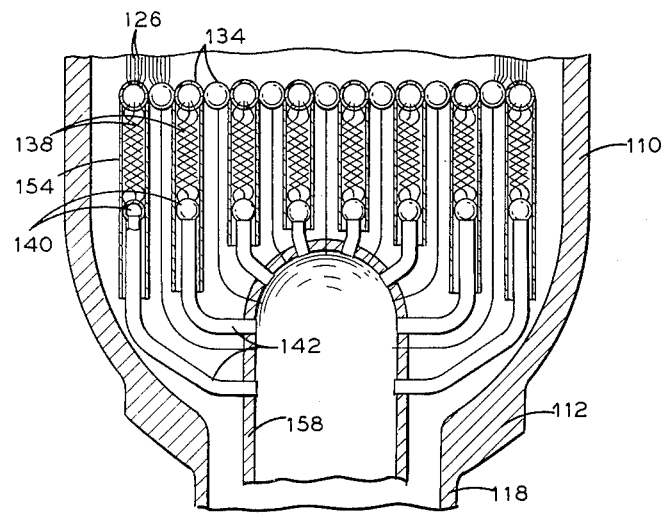
FIG. 4 is an alternative arrangement of the present invention.

An alternative arrangement of the present invention is illustrated in FIG. 4, with similar elements to those illustrated in FIG. 1 being identified with the same reference numeral with a prefix of "1," wherein headers 134 are spherical with the tubes 126 being arranged with bends in their ends to enter the headers radially. In this arrangement flow areas are provided between adjacent headers for the flow of the secondary fluid. Furthermore, differential expansion between individual tubes within a group of tubes may be more readily accommodated as a result of the bends in the individual tubes where they enter the header radially. An additional modification illustrated by FIG. 4 is the manner in which connecting tubes 142 are connected to the tubular nozzle. In this arrangement the length of the connecting tubes is minimized by the use of collecting chamber 158 closed at its upper end and connected at its lower end to the outlet nozzle.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. In heat transfer apparatus comprising a vessel having a fluid conduit disposed at each end, a plurality of tubular elements extending through said vessel and arranged in series flow relationship with said conduit at each end, a differential expansion compensator connected between an end of said tubular elements and one of said fluid conduits, said tubes being arranged in a plurality of bundles, means for passing a first fluid through said fluid conduits and said tubular elements, means for passing a second fluid externally of said tubular elements, said expansion compensator comprising a plurality of closely spaced hemispherical headers each having a substantially flat tube sheet connected to a bundle of said tubular elements, said headers arranged with flow spaces therebetween for the passage of said second fluid, and coiled tubular elements connecting each of said headers to said one of said fluid conduits to accommodate differential expansion between said pressure vessel and said tubular elements.

2. In heat transfer apparatus comprising a vessel having a fluid conduit disposed at each end, a tube sheet fixedly positioned in one end of said vessel, a plurality of tubular elements connected at one end to said tube sheet extending through said vessel and arranged in series flow relationship with said conduit at each end, a differential expansion compensator connected between the ends of said tubular elements opposite said tube sheet and said fluid conduit at the end of the vessel opposite said fixed tube sheet, said tubes being arranged in a plurality of bundles, means for passing a first fluid through said fluid conduits and said tubular elements, means for passing a second fluid externally of said tubular elements, said expansion compensator comprising a plurality of spherical headers each connected to a bundle of said tubular elements, said headers arranged with flow spaces therebetween for the passage of said second fluid, and a plurality of helicoidal tubular elements connecting each of said headers to said one of said fluid conduits to accommodate differential expansion between said pressure vessel and said tubular elements.

3. In heat transfer apparatus comprising an elongated pressure vessel having a fluid conduit disposed at each end, a tube sheet fixedly positioned in one end of said pressure vessel, a plurality of tubular elements connected at one end to said tube sheet extending through said vessel and arranged in series flow relationship with said conduit at each end, said pressure vessel and said tubular elements being formed of materials having different coefficients of expansion, a differential expansion compensator connected between the ends of said tubular elements opposite said tube sheet and one of said fluid conduits, said tubes being arranged in a plurality of bundles, means for passing a first fluid through said fluid conduits and said tubular elements, means for passing a second fluid through said pressure vessel externally of said tubular elements, said expansion compensator comprising a plurality of spherical headers each connected to a bundle of said tubular elements, said headers arranged with flow spaces therebetween for the passage of said second fluid, and a plurality of helicoidal tubular elements connecting each of said headers to said one of said fluid conduits to accommodate differential expansion between said pressure vessel and said tubular elements.

4. In heat transfer apparatus comprising an elongated pressure vessel having a fluid conduit disposed at each end, a tube sheet fixedly positioned in one end of said pressure vessel, a plurality of tubular elements connected at one end to said tube sheet extending through said vessel and arranged in series flow relationship with said conduit at each end, said pressure vessel and said tubular elements being formed of materials having different coefficients of expansion, a differential expansion compensator connected between the ends of said tubular elements opposite said tube sheet and one of said fluid conduits, said tubes being arranged in a plurality of bundles, means for passing a first fluid through said fluid conduits and said tubular elements, means for passing a second fluid through said pressure vessel externally of said tubular elements, said expansion compensator comprising a plurality of hemispherical headers, each, of said hemispherical headers having a substantially flat tube sheet connected to a bundle of said tubular elements, said headers arranged with flow spaces therebetween for the passage of said second fluid, and a plurality of helicoidal tubular elements connecting each of said headers to said one of said fluid conduits to accommodate differential expansion between said pressure vessel and said tubular elements.

References Cited by the Examiner

UNITED STATES PATENTS

| | | | |
|---|---|---|---|
| 2,839,276 | 6/1958 | Rossi | 165—82 X |
| 2,990,162 | 6/1961 | Otten | 165—145 X |
| 3,053,512 | 9/1962 | Soudan et al. | 165—145 X |

FREDERICK L. MATTESON, JR., *Primary Examiner.*

CHARLES SUKALO, *Examiner.*